US012646498B2

(12) United States Patent
Kutchko

(10) Patent No.: US 12,646,498 B2
(45) Date of Patent: Jun. 2, 2026

(54) SYSTEMS AND METHODS FOR MULTI-STAGE LANGUAGE ANALYSIS AND REMEDIATION OF ROBOCALLS

(71) Applicant: Verizon Patent and Licensing Inc., Basking Ridge, NJ (US)

(72) Inventor: Katrina Marie Kutchko, Edgewater, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 496 days.

(21) Appl. No.: 18/156,262

(22) Filed: Jan. 18, 2023

(65) Prior Publication Data

US 2024/0242706 A1 Jul. 18, 2024

(51) Int. Cl.
*G10L 15/26* (2006.01)
*G10L 15/00* (2013.01)
*G10L 25/51* (2013.01)

(52) U.S. Cl.
CPC ............ *G10L 15/005* (2013.01); *G10L 15/26* (2013.01); *G10L 25/51* (2013.01)

(58) Field of Classification Search
None
See application file for complete search history.

(56) References Cited

U.S. PATENT DOCUMENTS

| | | | |
|---|---|---|---|
| 2014/0270114 A1 | 9/2014 | Kolbegger et al. | |
| 2015/0206544 A1* | 7/2015 | Carter ..................... | G10L 15/04 |
| | | | 704/235 |
| 2020/0364297 A1* | 11/2020 | Cordell ................. | G06F 40/263 |
| 2024/0406227 A1* | 12/2024 | Pandit ................. | H04M 7/0078 |

FOREIGN PATENT DOCUMENTS

CN 114360541 A * 4/2022

OTHER PUBLICATIONS

Translation of CN 114360541 A, (Lv, Ning) 2022 (Year: 2022).*

* cited by examiner

*Primary Examiner* — Paras D Shah
*Assistant Examiner* — Ali M Hassan

(57) ABSTRACT

A system described herein may receive audio associated with a voice call; determine an amount of speech in the audio associated with the voice call; determine, based on the amount of speech, an expected length of a transcript, associated with a particular language, of the voice call; generate or receive the transcript, associated with the particular language, of the voice call; identify a length of the transcript, associated with the particular language, of the voice call; compare the length of the transcript to the expected length of the transcript; determine, based on comparing the length of the transcript to the expected length of the transcript, whether the voice call is associated with the particular language; and output an indication of whether the voice call is associated with the particular language.

20 Claims, 10 Drawing Sheets

600

602

Receive call audio

604

Perform operations associated with particular stage to identify language of call audio

606

Language identified with at least threshold measure of confidence?

Yes

No

612

Perform operations associated with next stage, based on call audio and output(s) of previous stage(s)

608

Output indication of detected language

610

Perform language-based robocall detection techniques

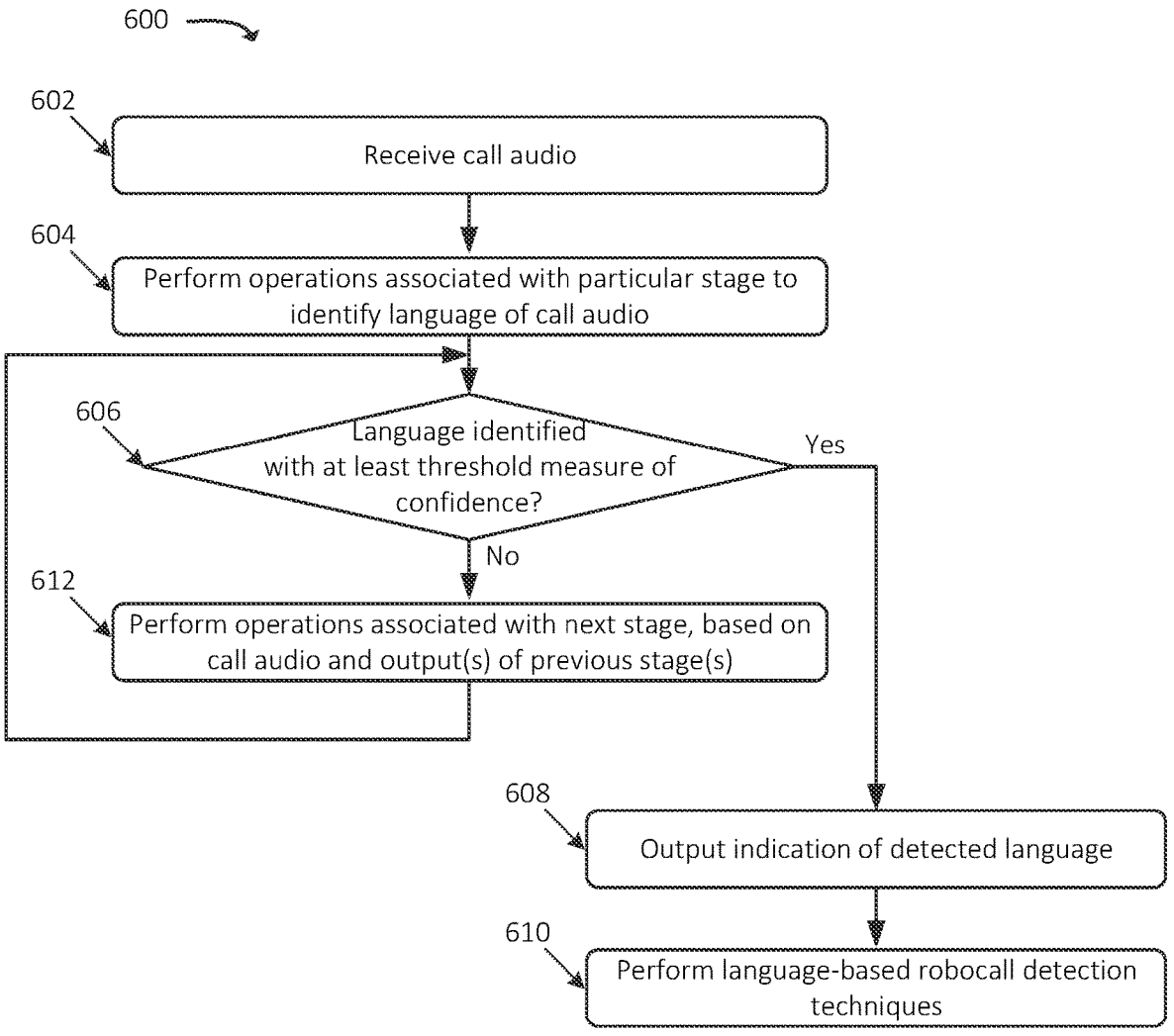

Bus
910

SYSTEMS AND METHODS FOR MULTI-STAGE LANGUAGE ANALYSIS AND REMEDIATION OF ROBOCALLS

BACKGROUND

Networks, such as wireless networks, may offer the ability for different entities to communicate with each other via voice calls. Some entities may utilize automated calling techniques and/or recorded messages (e.g., "robocalls") in order to provide the same information to numerous different individuals without needing to manually place such calls and/or without needing to have a person speaking the messages. Some such robocalls may be "spam" or may otherwise be undesirable to called parties and/or to networks carrying such calls.

BRIEF DESCRIPTION OF THE DRAWINGS

FIG. 6 illustrates an example process for performing a multi-stage language identification procedure, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for the use of artificial intelligence/machine learning ("AI/ML") techniques or other types of modeling techniques in order to detect and remediate undesirable calls, such as robocalls (e.g., voice calls placed automatically and/or that include one or more pre-recorded or automated messages). Some embodiments may detect a language associated with a robocall and/or a robocaller (e.g., an entity that places robocalls), such as English, Spanish, Mandarin, and/or other languages. Determining a language of a voice call may improve or facilitate the determination as to whether the voice call is a robocall and/or whether the voice call is otherwise an undesirable call (e.g., "spam"). For example, if the language of a voice call is ambiguous or unknown, it may be more difficult to ascertain whether the voice call is associated with a robocaller, is spam, etc., whereas determining the language of the voice call may greatly enhance the accuracy of the determination as to whether the voice call is associated with a robocaller, is spam, and/or is otherwise undesirable.

As discussed below, some embodiments may utilize a multi-stage approach, in which different detection techniques may be used to detect the language. An entity utilizing the multi-stage approach, such as a network via which calls are placed, a spam detection system, and/or some other suitable entity, may prioritize or prefer particular techniques of the multi-stage approach. For example, some of the techniques described herein may be less resource intensive (e.g., less processor intensive, less memory intensive, etc.) than other techniques, and a given entity may prioritize such techniques based on these factors. As another example, some of the techniques described herein may be less costly, may not be subject to licensing fees, etc., and the entity may prioritize such techniques based on these factors. In this manner, the multi-stage approach, of some embodiments, to detecting the language of a voice call may be configured according to objectives, factors, etc. that are prioritized by any given entity that utilizes such approach. Further, utilizing the multiple stages or techniques described herein may provide for enhanced accuracy of language detection of voice calls, thus ultimately improving the accuracy of detection of whether a voice call is a robocall, is spam, and/or is otherwise undesirable.

Figure 1:
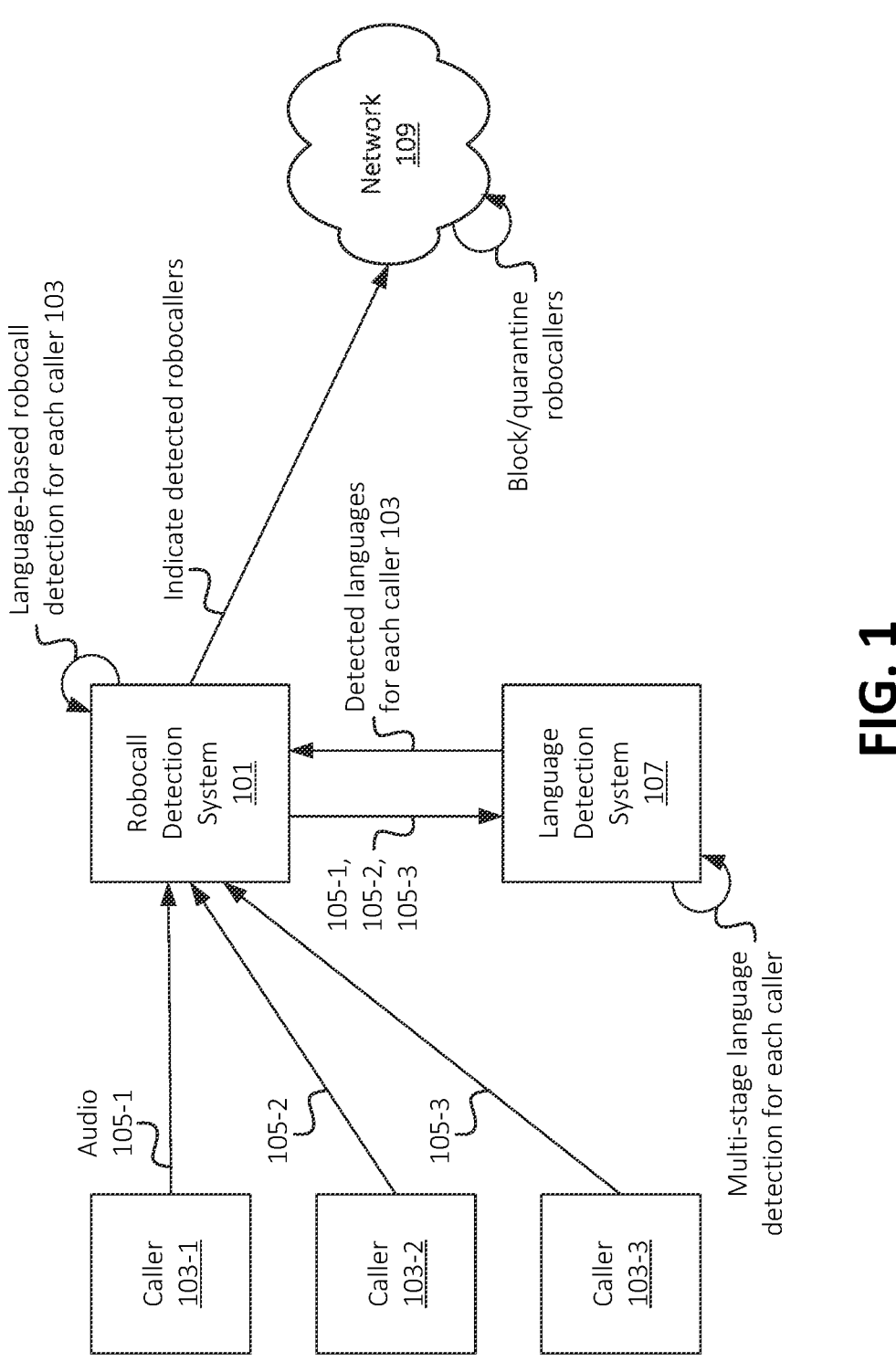
FIGS. 1 and 2 illustrate an example overview of one or more embodiments described herein.

As shown in FIG. 1, for example, Robocall Detection System ("RDS") 101 may receive voice calls from callers 103-1, 103-2, and 103-3. RDS 101 may, for example, be associated with one or more telephone numbers, Mobile Directory Numbers ("MDNs"), voice call application endpoint identifiers, or other types of identifiers via which RDS 101 may receive voice calls, video calls, and/or other types of communications with audible information (referred to herein simply as "audio"). For example, RDS 101 may receive audio 105-1 from caller 103-1, audio 105-2 from caller 103-2, and audio 105-3 from caller 103-3. RDS 101 may receive audio 105 from multiple callers 103 simultaneously, such as in situations where RDS 101 is associated with multiple telephone numbers, MDNs, etc. In some embodiments, RDS 101 may be a "honeypot," inasmuch as such telephone numbers associated with RDS 101 may be dedicated to detecting robocalls, spam calls, robocallers, spam callers, and/or other otherwise undesirable calls or callers 103.

For example, RDS 101 may analyze audio 105, may analyze text transcripts generated based on audio 105, attributes of particular callers 103, and/or other suitable information in order to detect whether a given caller 103 is a robocaller, a spammer, and/or is otherwise an undesirable caller. As noted above, such analysis and detection by RDS 101 may made more accurate in situations where RDS 101 is able to analyze callers 103 (and/or calls made by callers 103) based on which particular language is used by callers 103 (and/or is included in audio 105 associated with respective callers 103).

As such, in accordance with some embodiments, Language Detection System ("LDS") 107 may receive audio 105 associated with one or more callers 103 from which RDS 101 has received calls. For example, LDS 107 may receive all audio 105 associated with calls received by RDS 101, or LDS 107 may receive only a subset of audio 105 associated with calls received by RDS 101. For example, RDS 101 perform filtering or other operations on audio 105 and/or respective callers 103 to determine whether audio 105 of particular calls should be provided to LDS 107. RDS 101 may, for example, maintain a "suspected spammer" list or a "safe caller" list, based on which RDS 101 may provide audio 105 of calls from certain callers 103 to LDS 107 (e.g., calls from callers 103 on the "suspected spammer" list), and/or RDS 101 may forgo providing audio 105 of calls from other callers 103 to LDS 107 (e.g., calls from callers 103 on the "safe caller" list).

As another example, RDS 101 may provide audio 105 of calls for which the duration exceed a certain threshold (e.g., 30 seconds, 45 seconds, etc.) to LDS 107, while RDS 101 may forgo providing audio 105 of calls that do not exceed the threshold duration. In this sense, RDS 101 may detect robocallers, which may play pre-recorded messages even in the absence of a response from a called party (e.g., RDS 101 in these scenarios). In some embodiments, RDS 101 may perform other operations based on which RDS 101 may select particular audio 105 of certain calls to provide to LDS 107, which may perform operations described herein.

For example, as discussed below, LDS 107 may perform a multi-stage, a multi-pass, a multi-tiered, etc. set of operations in order to detect the language associated with each call or caller 103. Detailed examples of such operations are discussed below. As noted above, different stages of operations may be performed in different orders or sequences, as each stage of operations may have different pros and cons than other stages of operations (e.g., resource-intensiveness and/or resource availability, licensing or operational costs, etc.). As discussed below, the multiple stages of operations may include relatively lightweight operations, such as generating text transcripts of audio 105, analyzing amounts or proportions of audible sound in audio 105, and/or other operations.

Once LDS 107 has detected the language associated with each call or caller 103, LDS 107 may indicate the language to RDS 101. As discussed above, now that RDS 101 is "aware" of the languages associated with each call or caller 103, RDS 101 may perform one or more other suitable operations (e.g., language-based techniques such as word or phrase recognition, artificial intelligence/machine learning ("AI/ML") modeling techniques, etc.) to detect robocallers, spam callers, and/or otherwise undesirable callers. In some embodiments, RDS 101 may identify robocallers based on the detected language itself. For example, RDS 101 may maintain AI/ML models or other information that indicate that calls that include audio of a particular language are more likely to be robocalls than calls that include audio of other languages. RDS 101 may indicate the detected robocallers, spam callers, etc. to one or more devices, systems, networks (e.g., network 109), etc., which may take suitable action to remediate robocalls and/or other undesirable calls from the indicated callers 103. For example, network 109 may block, quarantine, etc. the identified robocalls. Network 109 may maintain MDNs and/or other identifiers of callers 103 in a "block list" or other type of data structure based on which network 109 may block, drop, etc. calls to and/or from the identified callers 103.

Figure 2:
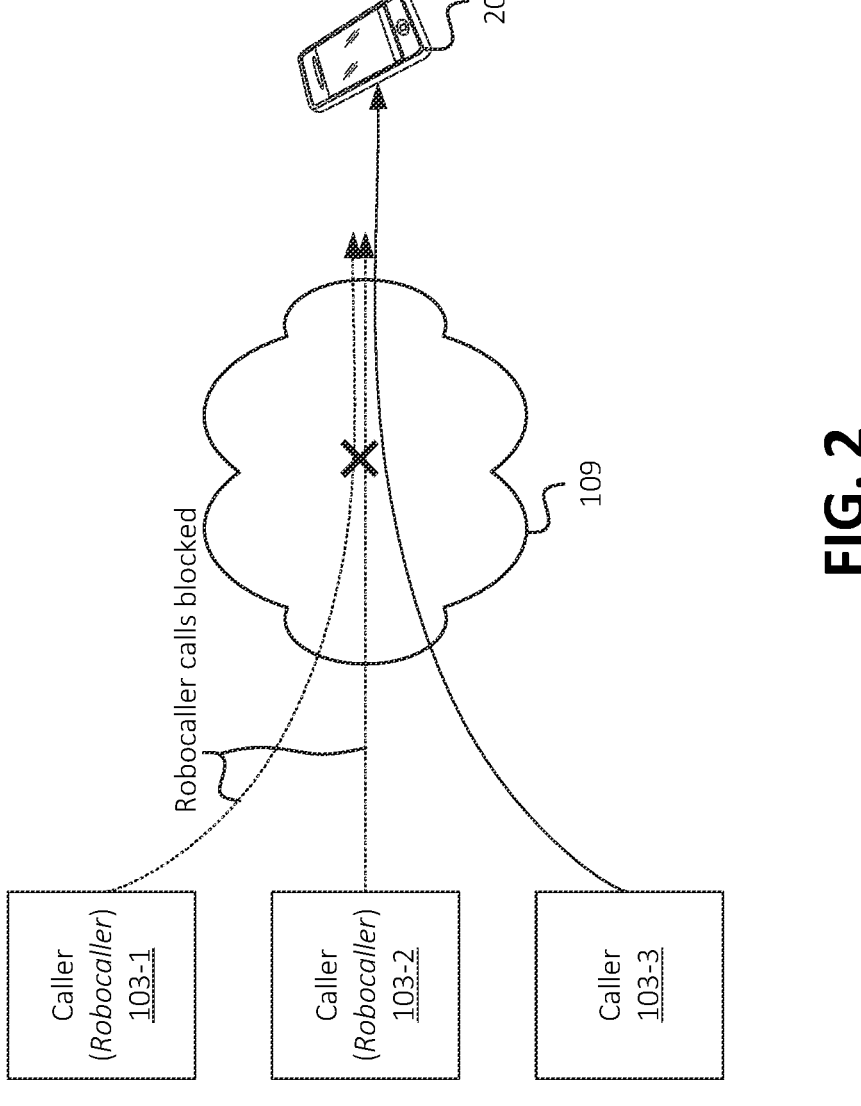

As shown in FIG. 2, for example, assume that callers 103-1 and 103-2 have been identified as robocallers. Further assume that callers 103-1 and 103-2 have initiated voice calls to a given User Equipment ("UE") 201, such as a mobile telephone, via network 109. Network 109 may block these calls, such as by forgoing initiating or allowing a call setup procedure between UE 201 and callers 103-1 and/or 103-2. On the other hand, assume that caller 103-3 has not been identified as a robocaller. Network 109 may initiate, facilitate, allow, etc. the voice call to be established between caller 103-3 and UE 201.

Figure 3A:
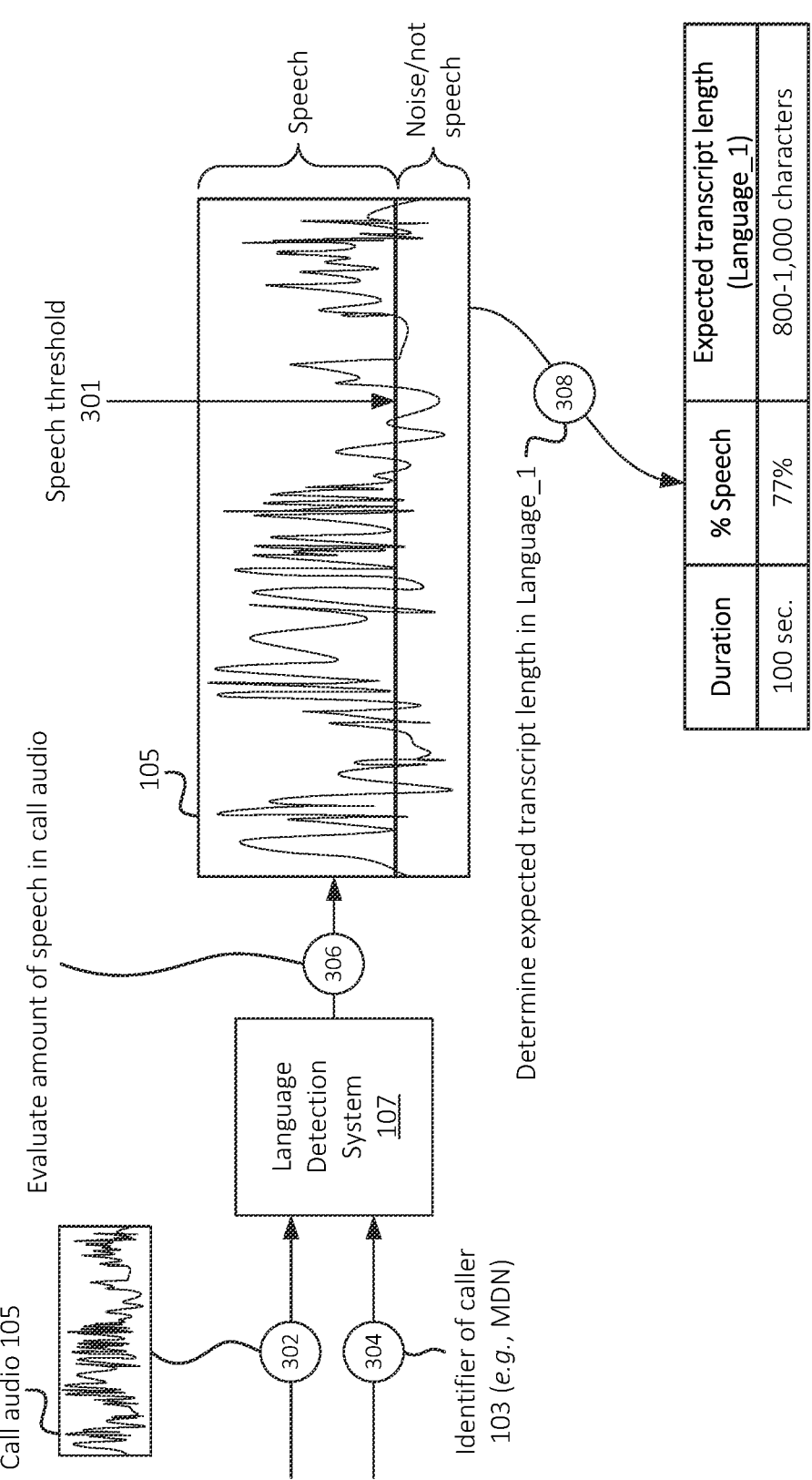
FIGS. 3A and 3B illustrate an example of a particular stage of operations in a multi-stage language identification procedure, in accordance with some embodiments.
Figure 3B:
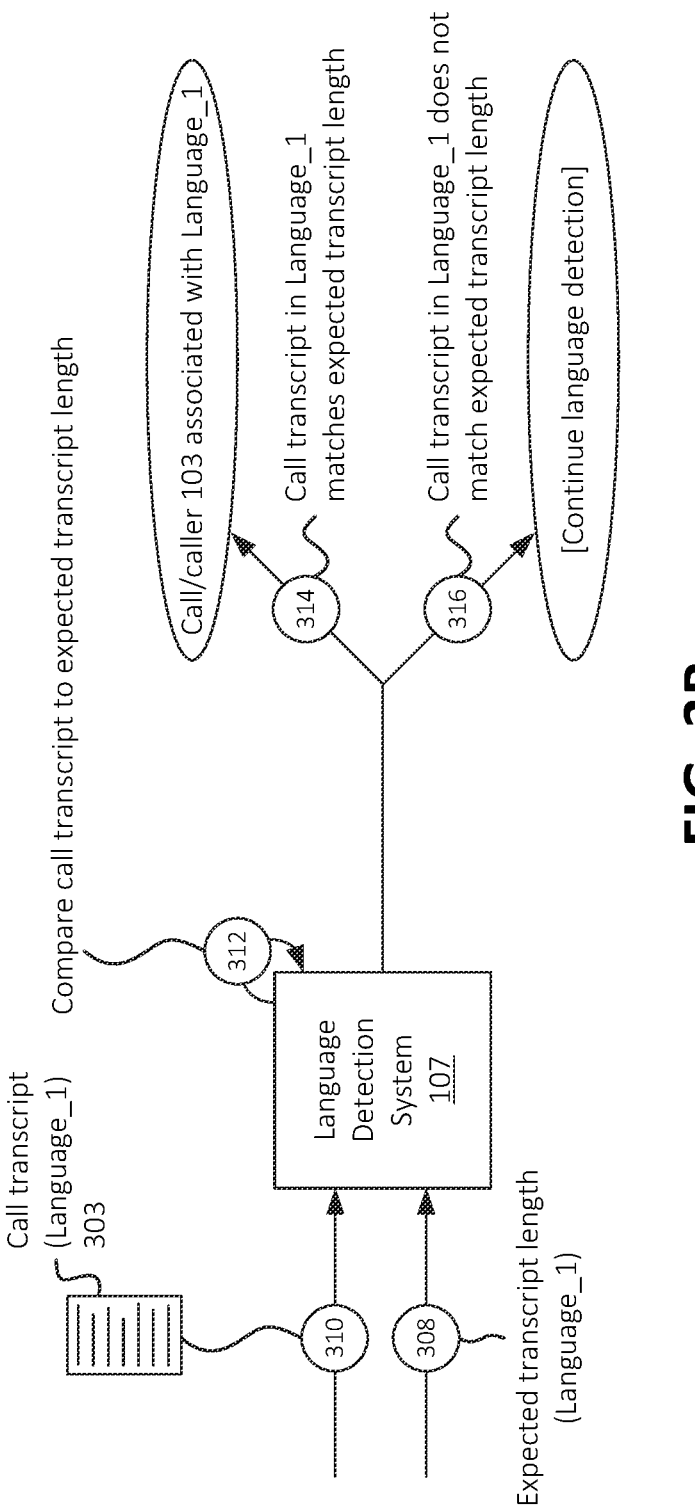

FIGS. 3A and 3B illustrate an example stage of operations that may be performed to identify a language of a particular call or caller 103. In this stage, an amount of speech in audio 105 of a given call may be compared to a transcript of audio 105 in a particular language, in order to determine a measure of probability or confidence that the language of the detected speech in audio 105 is the particular language (e.g., as opposed to some other language). For example, as shown in FIG. 3A, LDS 107 may receive (at 302) audio 105 associated with a particular call, such as a call between a particular caller 103 and LDS 107. That is, in some scenarios, LDS 107 may receive (at 302) audio 105 in "real time." In other scenarios, LDS 107 may receive (at 302) audio 105 after audio 105 has been received by some other device or system. For example, audio 105 may have been recorded, captured, etc., and provided (at 302) to LDS 107 at some later time after the call with which audio 105 is associated.

LDS 107 may also receive (at 304) an identifier of a particular caller 103 with which audio 105 is associated. For example, LDS 107 may receive an MDN or other identifier of caller 103. In this manner, LDS 107 may maintain information associating audio 105 with caller 103, and the output of operations performed at this stage (e.g., determining whether audio 105 includes a particular language or not) may be linked to the particular caller 103.

LDS 107 may evaluate (at 306) an amount of speech in audio 105. Audio 105 is represented as a waveform in FIG. 3A, where a higher amplitude may refer to louder volume of audio 105. LDS 107 may analyze what proportion of the waveform of audio 105 has a greater magnitude than a threshold magnitude (e.g., shown as "speech threshold" 301). In other words, LDS 107 may analyze what proportion, or how much, of the call has a higher volume than a threshold volume. In some embodiments, LDS 107 may generate or refine one or more models (e.g., using AI/ML techniques or other suitable modeling techniques) to determine speech threshold 301. In this manner, speech threshold 301 may be adjustable, optimizable, etc. to maximize the accuracy of the detection of speech during calls (e.g., as opposed to silence or non-speech sound, such as fan noise, ambient noise, background sounds, etc.).

In some embodiments, LDS 107 may split audio 105 into portions, subsets, time windows, etc., that are of a lesser duration than a total duration of audio 105. For example, LDS 107 may split audio 105 into 0.1-second portions, 0.05-second portions, etc., and may compare a magnitude of the amplitude of the waveform of audio 105 (e.g., the volume of audio 105) to speech threshold 301. For each such portion, LDS 107 may compare the average magnitude of the waveform (e.g., average volume over a 0.1-second time window), the peak magnitude of the waveform (e.g., highest volume over the 0.1-second time window), the lowest magnitude of the waveform (e.g., the lowest volume over the 0.1-second time window), the magnitude at a randomly selected point within the time window, and/or may otherwise determine the magnitude of the amplitude of the waveform during the time window. In some embodiments, LDS 107 may utilize one or more other techniques for identifying speech in audio 105, such as filtering out particular frequencies (e.g., frequencies outside of the range of human voice, frequencies associated with common noise sources, etc.), filtering out loud noises (e.g., a second threshold that specifies a maximum amplitude or volume), etc.

Assume, as one example, that audio 105 has a total length of 10 seconds, and that LDS 107 has accordingly analyzed 1,000 0.1-second time windows. Further assume that audio 105 has determined that 770 of the time windows included sound that exceeded a threshold volume (e.g., speech threshold 301), and that 230 of the time windows did not include sound that exceeded the threshold volume. In this example, LDS 107 may determine or estimate that 77% of audio 105 is speech, and/or that 23% of audio 105 is not speech.

LDS 107 may further determine (at 308) an expected transcript length of audio 105, in a particular language (referred to in the figures as "Language_1"). In some embodiments, LDS 107 may select Language_1 (e.g., out of a pool of candidate languages) for the operations described in FIGS. 3A and 3B based on attributes of caller 103 from which audio 105 was received and/or some other suitable information. For example, LDS 107 may receive or maintain information indicating that a pool of MDNs with which caller 103 is associated is associated with the particular language, and/or may otherwise identify that Language_1 is a likely language for the call or caller 103. In some embodiments, Language_1 may be a "default" language.

For example, LDS 107 may maintain, refine, etc. one or more models (e.g., using AI/ML modeling techniques or other suitable modeling techniques) that indicate an expected quantity of characters, words, phrases, etc., in the particular language, of a transcript (e.g., using voice-to-text techniques) of a given amount of speech. In this example, the amount of speech (e.g., which may be provided as input to such one or more models) may be represented as a duration of audio 105 as well as the proportion of speech determined in audio 105 (e.g., 77% of a 100-second long audio 105, in this example). In other examples, the amount of speech may be represented in some other manner, such as a function of the duration and speech proportion of audio 105 (e.g., 77 seconds, in this example), and/or some other suitable value that is based on the duration of audio 105 and/or the determined (at 306) amount of speech in audio 105. In this example, the expected transcript length, in Language_1, is 800-1,000 characters, based on the duration of audio 105 as well as the proportion of audio 105 that has been determined (at 306) as including speech.

As shown in FIG. 3B, may generate or receive (at 310) call transcript 303 based on audio 105. Call transcript 303 may be generated using speech-to-text techniques or other suitable techniques that generate text (e.g., words, phrases, etc.) based on audio information. In accordance with some embodiments, call transcript 303 may be associated with a particular language (e.g., Language_1, such as English, Spanish, Mandarin, and/or some other language). That is, LDS 107 and/or other device or system generating call transcript 303 may attempt to identify words, phrases, etc. in Language_1 based on audio information (e.g., audible features or other detectable information) detected in audio 105. As discussed above, LDS 107 may have selected Language_1 out of a pool of candidate languages based on attributes of caller 103 and/or other suitable criteria.

LDS 107 may compare (at 312) call transcript 303 to the determined (at 308) expected transcript length of audio 105. For example, LDS 107 may compare a length of call transcript 303 (e.g., a quantity of characters, words, etc. of call transcript 303) to an expected transcript length (e.g., expected quantity of characters, words, etc.), as determined (at 308) based on the amount of speech identified in audio 105. If the length of call transcript 303 matches the expected transcript length (e.g., falls within an expected range, meets or exceeds one or more thresholds, etc.), then LDS 107 may determine (at 314) that the call and/or caller 103 is associated with Language_1. If, on the other hand, the length of call transcript 303 does not match the expected transcript length (e.g., is shorter than expected, is longer than expected, etc.), then LDS 107 may determine (at 316) that the call and/or caller 103 is not (or may potentially not be) associated with Language_1. Generally, for example, if the call is in a different language than Language_1, then speech-to-text techniques may fail to identify some or all of the words of audio 105, and may generate incorrect text which may include shorter words than the actual spoken words, may include longer words, or may omit certain unrecognized words or phrases (e.g., spoken words or phrases in another language that may not have a corresponding or matching word in Language_1). As such, in these situations, there may be a mismatch between the length of call transcript 303 and the expected transcript length in Language_1.

In some embodiments, when determining (at 314) that the call or caller 103 is associated with Language_1, LDS 107 may cease analysis of audio 105 and may output or record an indication that the call or caller 103 is associated with Language_1. As discussed above, RDS 101 may perform further operations or logic to detect whether caller 103 is a robocaller, spammer, etc., which may include comparing an amount of speech, a duration of the call, etc. to one or more thresholds. For example, RDS 101 may identify that the call is at least a threshold duration and/or includes at least a threshold amount of speech, which may indicate that the call is a recording (e.g., a recording may continue to play speech while a live person may cease speaking if a response is not received from a called party).

On the other hand, when determining (at 316) that the call or caller 103 is (or potentially may not be) associated with Language_1, LDS 107 may continue performing other operations to detect or determine a language of the call or of caller 103.

Figure 4:
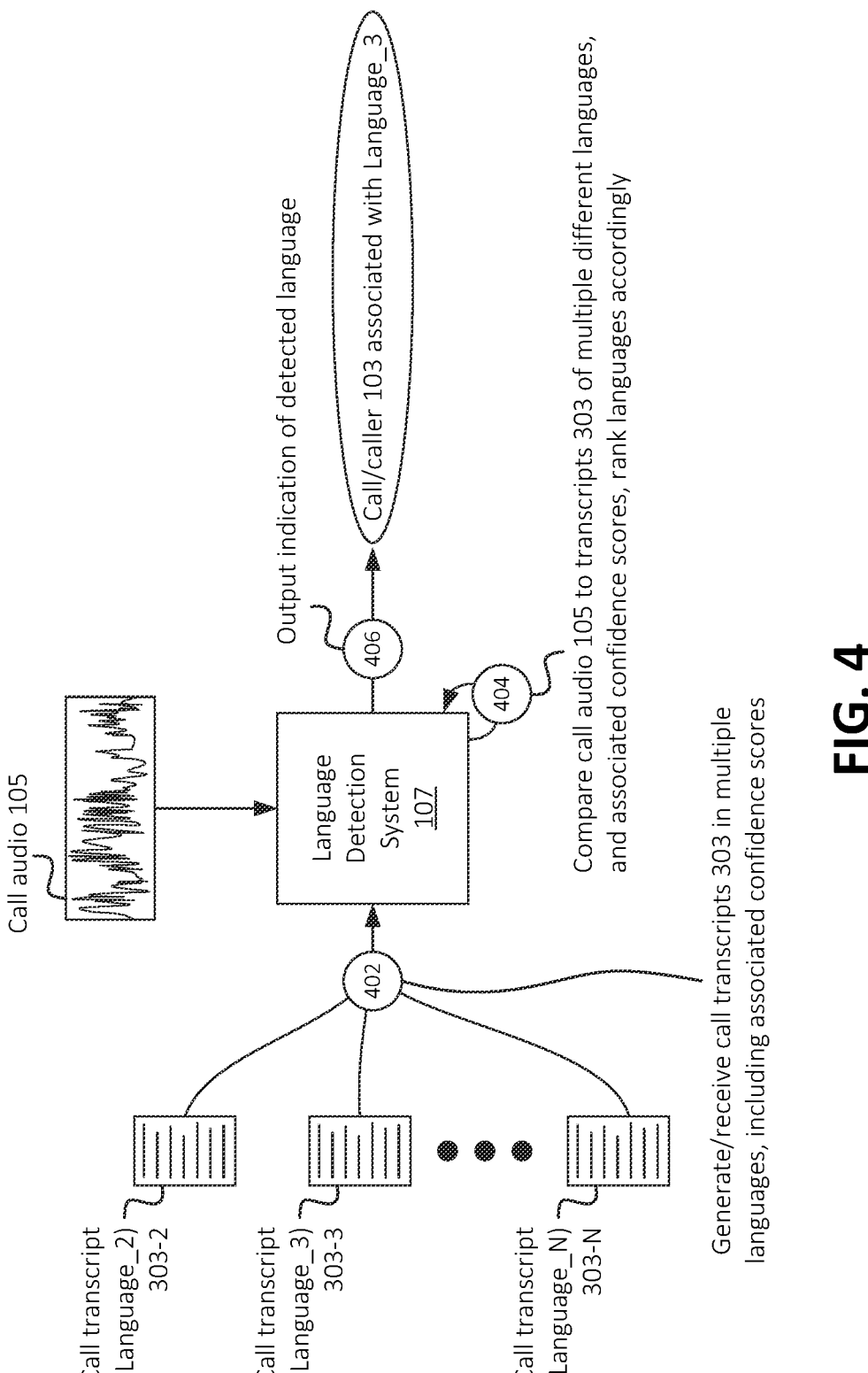
FIG. 4 illustrates an example of a particular stage of operations in a multi-stage language identification procedure, in accordance with some embodiments.

For example, as shown in FIG. 4, LDS 107 may generate or receive (at 402) one or more additional call transcripts 303, based on audio 105, in other languages. For example, LDS 107 may generate or receive (at 402) call transcript 303-2 based on Language_2, call transcript 303-3 based on Language_3, call transcript 303-N based on Language_N, etc. In some embodiments, each call transcript 303 (e.g., call transcripts 303-2 through 303-N) may be generated or otherwise associated with a confidence score, indicating a measure of likelihood or confidence that each respective 303 is an accurate transcription of audio 105. For example, LDS 107 (and/or some other suitable device or system that generates call transcripts 303) may indicate a relatively low confidence score for a particular call transcript 303 of a given language if certain words or phrases of audio 105 were unrecognized or are otherwise a relatively poor fit for words or phrases of the particular language of call transcript 303 as detected in audio 105, whereas a relatively high confidence score for call transcript 303 of the given language may indicate that some or all words of call transcript 303 were determined as being a match for words or phrases detected in audio 105.

LDS 107 may compare (at 404) audio 105 to call transcripts 303 of the multiple different languages (e.g., call transcript 303-2, call transcript 303-3, etc.), in order to identify the language of audio 105. For example, in some embodiments, LDS 107 may perform one or more similar operations as discussed above with respect to FIGS. 3A and 3B, such as identifying an expected transcript length of audio 105 in each language, and comparing call transcripts 303 of the different languages to audio 105. For example, LDS 107 may utilize one or more models that receive, as input, audio 105 and an identified language, and that output an expected transcript length of audio 105 in that language. In some embodiments, such models may include AI/ML models, gradient boosting models (e.g., where features associated with a respective language may be boosted or prioritized for evaluating a transcript of such language), and/or other suitable models. In this manner, different call transcripts 303 may be compared to different transcript lengths, as different languages may utilize words, phrases, etc. of diverse spellings, numbers of characters, etc.

In some embodiments, LDS 107 may rank each language or call transcript 303 based on such comparison. For example, if call transcript 303-2 is a relatively close match to its expected transcript length in Language_2 (e.g., within 5% of an expected transcript length in Language_2) and call transcript 303-3 is a less close match to its expected transcript length in Language_3 (e.g., 20% shorter than an expected transcript length in Language_3), then LDS 107 may rank Language_2 higher than Language_3. In some embodiments, when ranking the languages, LDS 107 may further rank the languages based on the associated confidence scores of the transcriptions (e.g., may utilize such confidence scores as a weight or coefficient that modifies a ranking based on a closeness of call transcripts 303 to their respective transcript lengths). LDS 107 may select a particular language based on the ranking, such as a highest ranked language, as the detected language of audio 105. Although not explicitly shown in this example, in some embodiments, LDS 107 may perform (at 404) similar operations on call transcript 303 associated with Language_1, in the event that the determination (at 316) was a "false negative." For example, in some situations, Language_1 may ultimately be identified (at 404) as the language of audio 105, even if Language_1 was not initially identified (at 316).

In some embodiments, LDS 107 may compare a measure of closeness or similarity between the lengths of call transcripts 303 to their respective expected transcript lengths, to a threshold measure of closeness. In some such embodiments, if none of the call transcripts 303 are close enough to their expected transcript lengths, then LDS 107 may determine that the language of audio 105 is some other language, which may not have been analyzed, and/or may be a combination of different languages.

LDS 107 may output (at 406) an indication of the detected language (e.g., to RDS 101), and/or an indication that the language could not be detected. As discussed above, RDS 101 may perform additional operations, based on the indicated (at 406) language to identify whether the call or caller 103 is associated with robocalls, spam calls, etc.

Figure 5:
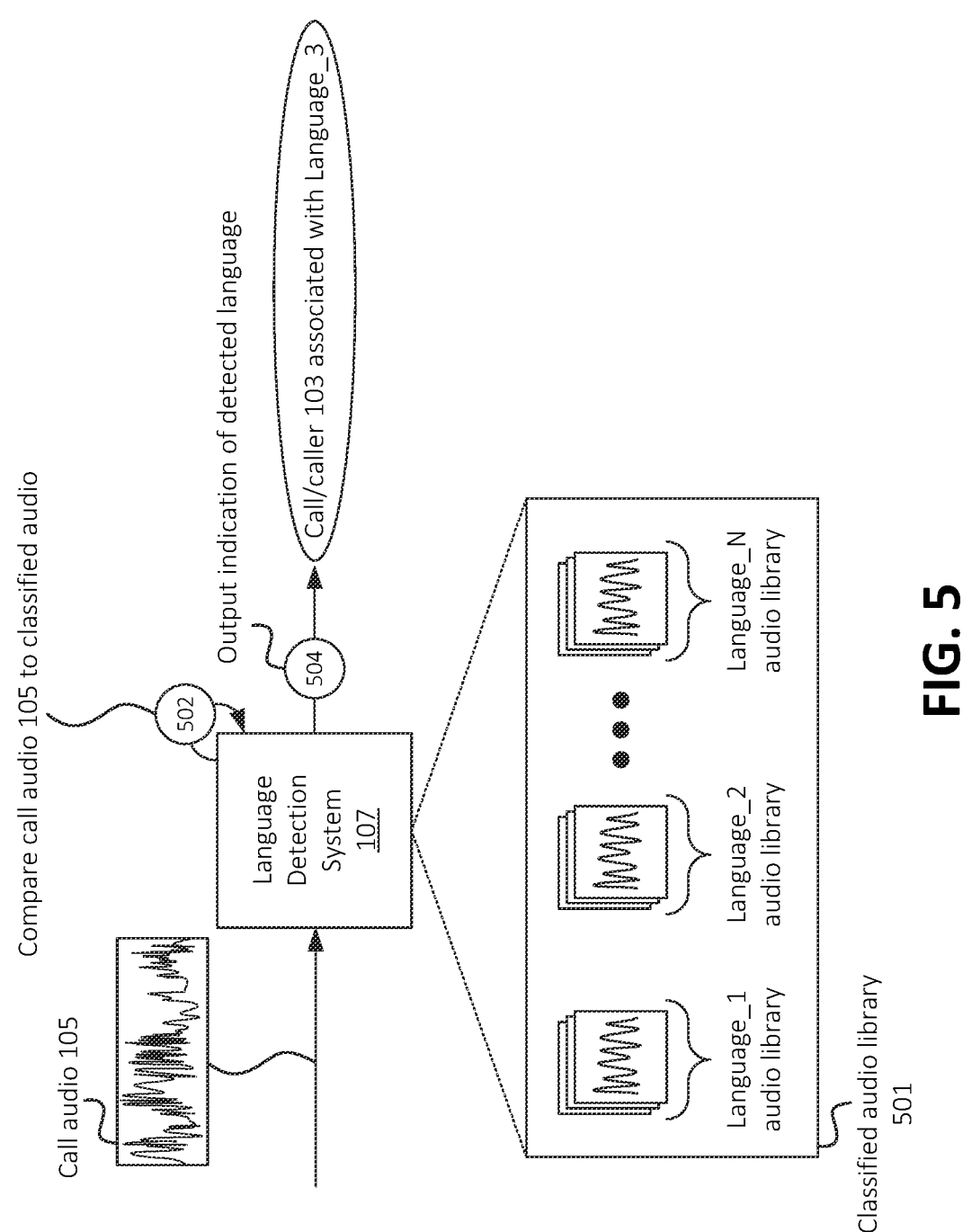
FIG. 5 illustrates an example of a particular stage of operations in a multi-stage language identification procedure, in accordance with some embodiments.

FIG. 5 illustrates another example stage of operations that may be performed to detect a language of a voice call, in some embodiments. As shown, LDS 107 may receive or maintain classified audio library 501, which may include recordings, files, etc. of audio (e.g., previously received audio 105 associated with one or more calls and/or callers 103) that has been previously classified as being associated with a particular language. For example, classified audio library 501 may include a first subset of audio that has been identified as including Language_1 speech (shown as "Language_1 audio library"), a second subset of audio that has been identified as including Language_2 speech (shown as "Language_2 audio library"), and so on. The audio according to the different languages may have been identified, classified, etc. based on manual annotations or classifications, AI/ML modeling techniques, reinforced learning techniques, and/or other suitable techniques. In some embodiments, the audio according to the different languages may have been previously identified, classified, etc. based on one or more techniques described above (e.g., with respect to FIGS. 3A and 3B and/or with respect to FIG. 4).

In some embodiments, classified audio library 501 may include metadata, processed data, etc. that is based on previously classified call audio. For example, for a given call and/or for audio corresponding to the given call, classified audio library 501 may include one or more Fast Fourier Transforms ("FFTs") and/or other processed data generated according to one or more suitable techniques. In some embodiments, the FFTs may be post-processed, smoothed, interpolated over a given frequency range, normalized, and/or other operations may be performed on the FFTs.

LDS 107 may compare (at 502) particular audio 105, associated with a given call or caller 103, to some or all of the audio included in classified audio library 501. For example, in some embodiments, LDS 107 may perform the same operations on audio 105 as were performed on the audio included in classified audio library 501 in order to generate a processed version of audio 105 (e.g., a processed or post-processed FFT of audio 105), and may perform a suitable similarity or correlation analysis on the processed version of audio 105 and some or all of the audio in classified audio library 501 in order to determine a measure of similarity between the processed version of audio 105 and the information stored in classified audio library 501. LDS 107 may, for example, identify a particular language for which the processed version of audio 105 has a highest measure of similarity to some or all of the classified audio of that language. For example, LDS 107 may generate a similarity score between audio 105 (e.g., the processed of audio 105) and each item of classified audio, indicating a measure of similarity between audio 105 and the classified audio. LDS 107 may further generate an average score, median score, and/or some other composite based on multiple similarity scores associated with each language. For example, audio 105 may have a higher average similarity score for a particular language than for other languages in the event that audio 105 includes speech of the particular language.

In some embodiments, LDS 107 may further identify whether the similarity scores between audio 105 and classified audio of a given language exceed a threshold measure of similarity. For example, situations may occur where audio 105 is most similar to classified audio of a particular language, but the relative similarity between audio 105 and the classified audio of all languages is relatively low. In such a scenario, audio 105 may include speech of another language, and/or the language of audio 105 may not be able to be identified with at least a threshold level of confidence.

LDS 107 may further output or record (at 504) the detected language (or an indication that the language could not be identified with at least a threshold measure of confidence). As discussed above, RDS 101 may perform one or more techniques to identify whether the call or caller 103 is associated with robocalls, spam, etc., which may include techniques based on the detected language of audio 105.

FIG. 6 illustrates an example process 600 for performing a multi-stage language detection operation of some embodiments. In some embodiments, some or all of process 600 may be performed by LDS 107. In some embodiments, one or more other devices may perform some or all of process 600 in concert with, and/or in lieu of, LDS 107 (e.g., RDS 101).

As shown, process 600 may include receiving (at 602) call audio 105. For example, LDS 107 may receive audio 105 in real time (e.g., while a particular caller 103 is outputting speech or playing a recording during a voice call), or may receive a recording of audio 105 after the conclusion of a call. Audio 105 may have been received by RDS 101 and/or some other device or system.

Process 600 may further include performing (at 604) operations associated with a particular stage of a multi-stage language detection procedure in order to identify a language of audio 105. For example, as discussed above with respect to FIGS. 3A and 3B, LDS 107 may determine an amount of speech in audio 105, determine an expected transcript length of audio 105 in a particular language based on the determined amount of speech, generate or receive call transcript 303 of audio 105 in the particular language, compare a length of call transcript 303 to the expected transcript length, and determine based on the comparison whether audio 105 is associated with the particular language (e.g., if the length of call transcript 303 matches or falls within a threshold range of the expected transcript length).

As another example, as discussed above with respect to FIG. 4, LDS 107 may determine an amount of speech in audio 105, determine expected transcript lengths of audio 105 in multiple different languages based on the determined amount of speech, generate or receive multiple call transcripts 303 of audio 105 in the multiple languages, compare respective lengths of the call transcripts 303 to the expected transcript length of each respective language, and determine based on the comparison which language is a match, "best fit," etc. for audio 105. As yet another example, as discussed above with respect to FIG. 5, LDS 107 may compare audio 105 and/or a processed version thereof (e.g., a post-processed FFT of audio 105) to previously classified audio (e.g., that has been classified as being associated with one or more respective languages), in order to determine a match, "best fit," etc. between audio 105 and previously classified audio of a particular language.

As discussed above, LDS 107 may select one such set of operations as a first stage (at 604) of a multi-stage language detection of audio 105. For example, LDS 107 may select a different stage as the first stage to perform based on factors such as call length, attributes of caller 103 associated with audio 105, available processing resources of LDS 107 (e.g., less processor-intensive operations may be selected when LDS 107 has less processing resources available, while more processor-intensive operations may be selected when LDS 107 has more processing resources available), and/or other factors.

Process 600 may include determining (at 606) whether the language of audio 105 has been identified with at least a threshold measure of confidence. For example, based on the operations performed (at 604) on audio 105 associated with the first selected stage of operations, LDS 107 may determine whether the language of audio 105 has been identified with at least the threshold measure of confidence. For example, LDS 107 may determine whether a length of call transcript 303 in a given language matches an expected transcript length for that given language (e.g., matches within a threshold measure of similarity). As another example, LDS 107 may determine whether audio 105 matches previously classified audio of a particular language with at least a threshold measure of similarity. In the event that the language has been identified with at least the threshold measure of confidence (at 606—YES), then process 600 may further include outputting (at 608) an indication of the detected language. For example, LDS 107 may indicate the language to RDS 101 and/or some other device or system.

As discussed above, RDS 101 may perform (at 610) one or more additional operations based on the provided information, such as performing one or more robocall detection techniques based on the identified language, one or more spam call detection techniques based on the identified language, etc. As also discussed above, robocallers, spam callers, etc. may be identified and indicated to network 109 and/or some other suitable device or system, which may take remedial action such as blocking calls from such callers 103, suspending accounts associated with such callers 103, and/or other suitable remedial action.

On the other hand, in the event that the language of audio 105 has not been identified with at least a threshold measure of confidence after the first stage of operations (at 606—NO), then process 600 may continue with performing (at 612) operations associated with a next stage. For example, the next stage may include performing operations, associated with the next stage, based on audio 105 and further based on outputs of one or more previously performed stages. For example, if three stages of operations are performed (e.g., at 604 and two iterations of 612), then a fourth stage may include performing operations based on audio 105 and the output of the previous three stages of operations. The outputs of a given stage may include, for example, a confidence level, a score, etc. indicating a likelihood that audio 105 is associated with one or more particular languages. In this manner, operations of a given stage may more heavily weight or prioritize languages that have been indicated, by previous stages, as being more likely to match audio 105 than other languages. As such, the multiple stages of operations may be "collaborative," may be inter-related, or may build upon each other, such that the use of multiple stages of operations provides greater accuracy of identification than individually performing some or all of the stages.

Figure 7:
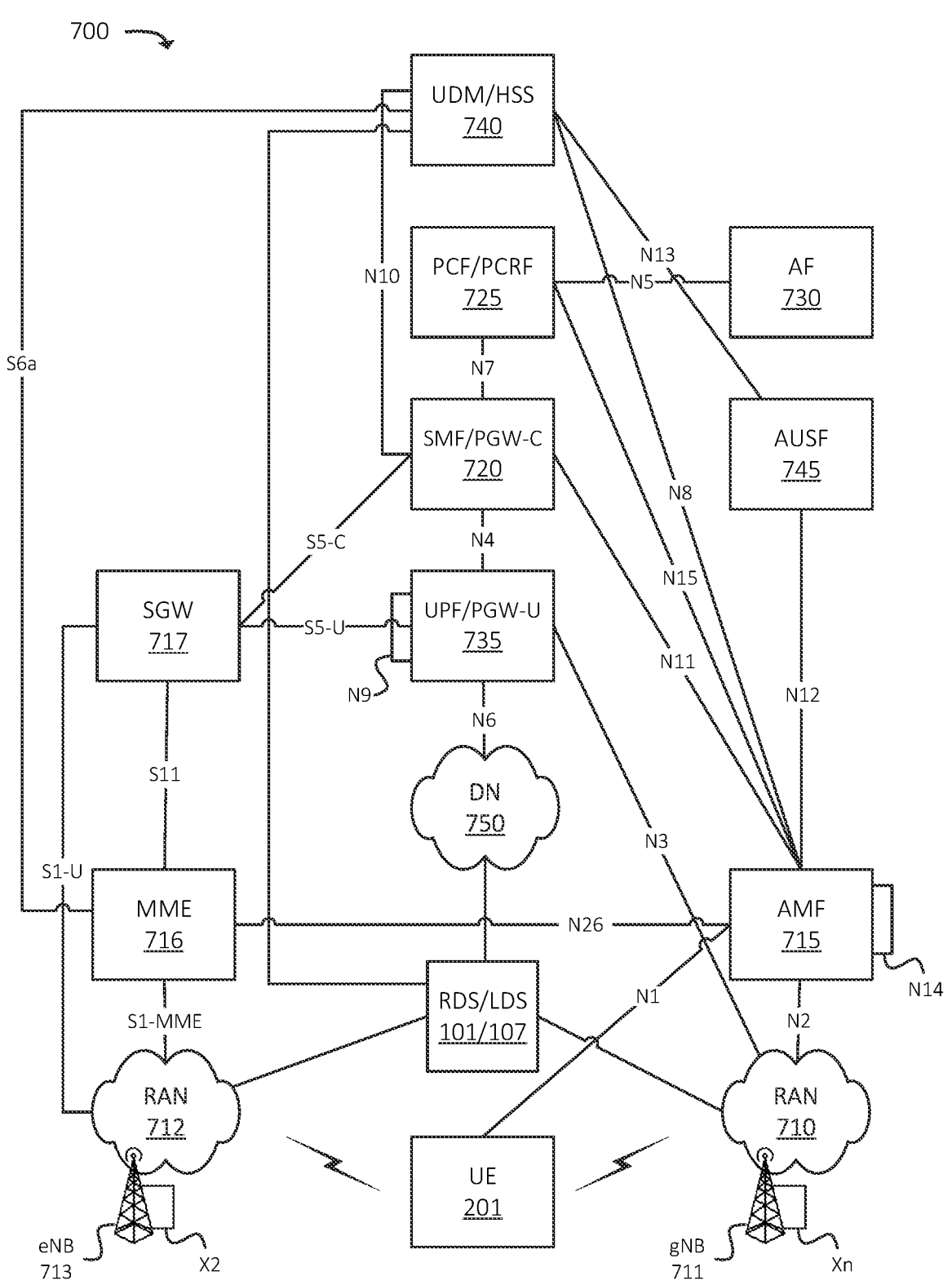
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 201, RAN 710 (which may include one or more Next Generation Node Bs ("gNBs") 711), RAN 712 (which may include one or more evolved Node Bs ("eNBs") 713), and various network functions such as Access and Mobility Management Function ("AMF") 715, Mobility Management Entity ("MME") 716, Serving Gateway ("SGW") 717, Session Management Function ("SMF")/Packet Data Network ("PDN") Gateway ("PGW")-Control plane function ("PGW-C") 720, Policy Control Function ("PCF")/Policy Charging and Rules Function ("PCRF") 725, Application Function ("AF") 730, User Plane Function ("UPF")/PGW-User plane function ("PGW-U") 735, Unified Data Management ("UDM")/Home Subscriber Server ("HSS") 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as RDS 101 and/or LDS 107.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/ PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to network 109.

UE 201 may include a computation and communication device, such as a wireless mobile communication device that is capable of communicating with RAN 710, RAN 712, and/or DN 750. UE 201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., which may include one or more sensors, a smart home appliance, etc.), a wearable device, a Machine-to-Machine ("M2M") device, or another type of mobile computation and communication device. UE 201 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 201 may communicate with one or more other elements of environment 700. UE 201 may communicate with RAN 710 via an air interface (e.g., as provided by gNB 711). For instance, RAN 710 may receive traffic (e.g., user plane traffic such as voice call traffic, data traffic, messaging traffic, etc.) from UE 201 via the air interface, and may communicate the traffic to UPF/PGW-U 735 and/or one or more other devices or networks. Further, RAN 710 may receive signaling traffic, control plane traffic, etc. from UE 201 via the air interface, and may communicate such signaling traffic, control plane traffic, etc. to AMF 715 and/or one or more other devices or networks. Additionally, RAN 710 may receive traffic intended for UE 201 (e.g., from UPF/PGW-U 735, AMF 715, and/or one or more other devices or networks) and may communicate the traffic to UE 201 via the air interface.

RAN 712 may be, or may include, a LTE RAN that includes one or more base stations (e.g., one or more eNBs 713), via which UE 201 may communicate with one or more other elements of environment 700. UE 201 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 201 via the air interface, and may communicate the traffic to UPF/ PGW-U 735 (e.g., via SGW 717) and/or one or more other devices or networks. Further, RAN 712 may receive signaling traffic, control plane traffic, etc. from UE 201 via the air interface, and may communicate such signaling traffic, control plane traffic, etc. to MME 716 and/or one or more other devices or networks. Additionally, RAN 712 may receive traffic intended for UE 201 (e.g., from UPF/PGW-U 735, MME 716, SGW 717, and/or one or more other devices or networks) and may communicate the traffic to UE 201 via the air interface.

AMF 715 may include one or more devices, systems, Virtualized Network Functions ("VNFs"), Cloud-Native Network Functions ("CNFs"), etc., that perform operations to register UE 201 with the 5G network, to establish bearer channels associated with a session with UE 201, to hand off UE 201 from the 5G network to another network, to hand off UE 201 from the other network to the 5G network, manage mobility of UE 201 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 201 with the EPC, to establish bearer channels associated with a session with UE 201, to hand off UE 201 from the EPC to another network, to hand off UE 201 from another network to the EPC, manage mobility of UE 201 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 201. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 201, from DN 750, and may forward the user plane data toward UE 201 (e.g., via RAN 710, SMF/PGW-C 720, and/or one or more other devices). In some embodiments, multiple UPFs 735 may be deployed (e.g., in different geographical locations), and the delivery of content to UE 201 may be coordinated via the N9 interface (e.g., as denoted in FIG. 7 by the line marked "N9" originating and terminating at UPF/PGW-U 735). Similarly, UPF/PGW-U 735 may receive traffic from UE 201 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 201.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 201 may communicate, through DN 750, with data servers, other UEs 201, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 201 may communicate.

Figure 8:
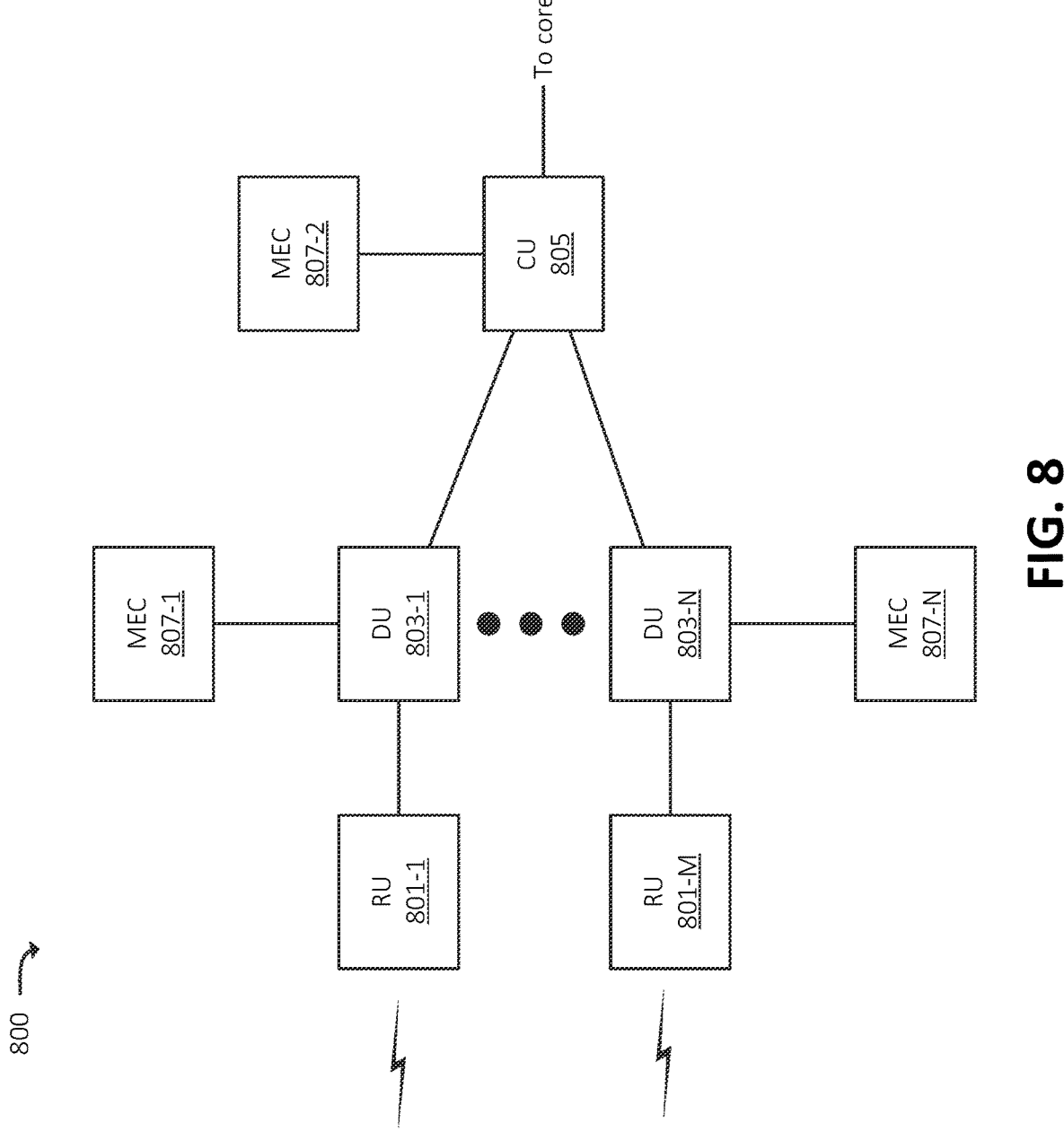
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 710, RAN 712, or some other RAN). In some embodiments, a particular RAN may include one RAN environment 800. In some embodiments, a particular RAN may include multiple RAN environments 800. In some embodiments, RAN environment 800 may correspond to a particular gNB 711 of a 5G RAN (e.g., RAN 710). In some embodiments, RAN environment 800 may correspond to multiple gNBs 711. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 201 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 201, and may determine which DU(s) 803 should receive the downlink traffic. DU 803 may include one or more devices that transmit traffic between a core network (e.g., via CU 805) and UE 201 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 201.

RU 801 may include hardware circuitry (e.g., one or more RF transceivers, antennas, radios, and/or other suitable hardware) to communicate wirelessly (e.g., via an RF interface) with one or more UEs 201, one or more other DUs 803 (e.g., via RUs 801 associated with DUs 803), and/or any other suitable type of device. In the uplink direction, RU 801 may receive traffic from UE 201 and/or another DU 803 via the RF interface and may provide the traffic to DU 803. In the downlink direction, RU 801 may receive traffic from DU 803, and may provide the traffic to UE 201 and/or another DU 803.

One or more elements of RAN environment 800 may, in some embodiments, be communicatively coupled to one or more Multi-Access/Mobile Edge Computing ("MEC") devices, referred to sometimes herein simply as "MECs" 807. For example, DU 803-1 may be communicatively coupled to MEC 807-1, DU 803-N may be communicatively coupled to MEC 807-N, CU 805 may be communicatively coupled to MEC 807-2, and so on. MECs 807 may include hardware resources (e.g., configurable or provisionable hardware resources) that may be configured to provide services and/or otherwise process traffic to and/or from UE 201, via a respective RU 801.

For example, DU 803-1 may route some traffic, from UE 201, to MEC 807-1 instead of to a core network via CU 805. MEC 807-1 may process the traffic, perform one or more computations based on the received traffic, and may provide traffic to UE 201 via RU 801-1. In some embodiments, MEC 807 may include, and/or may implement, some or all of the functionality described above with respect to RDS 101, LDS 107, AF 730, UPF 735, and/or one or more other devices, systems, VNFs, CNFs, etc. In this manner, ultra-low latency services may be provided to UE 201, as traffic does not need to traverse DU 803, CU 805, links between DU 803 and CU 805, and an intervening backhaul network between RAN environment 800 and the core network.

Figure 9:
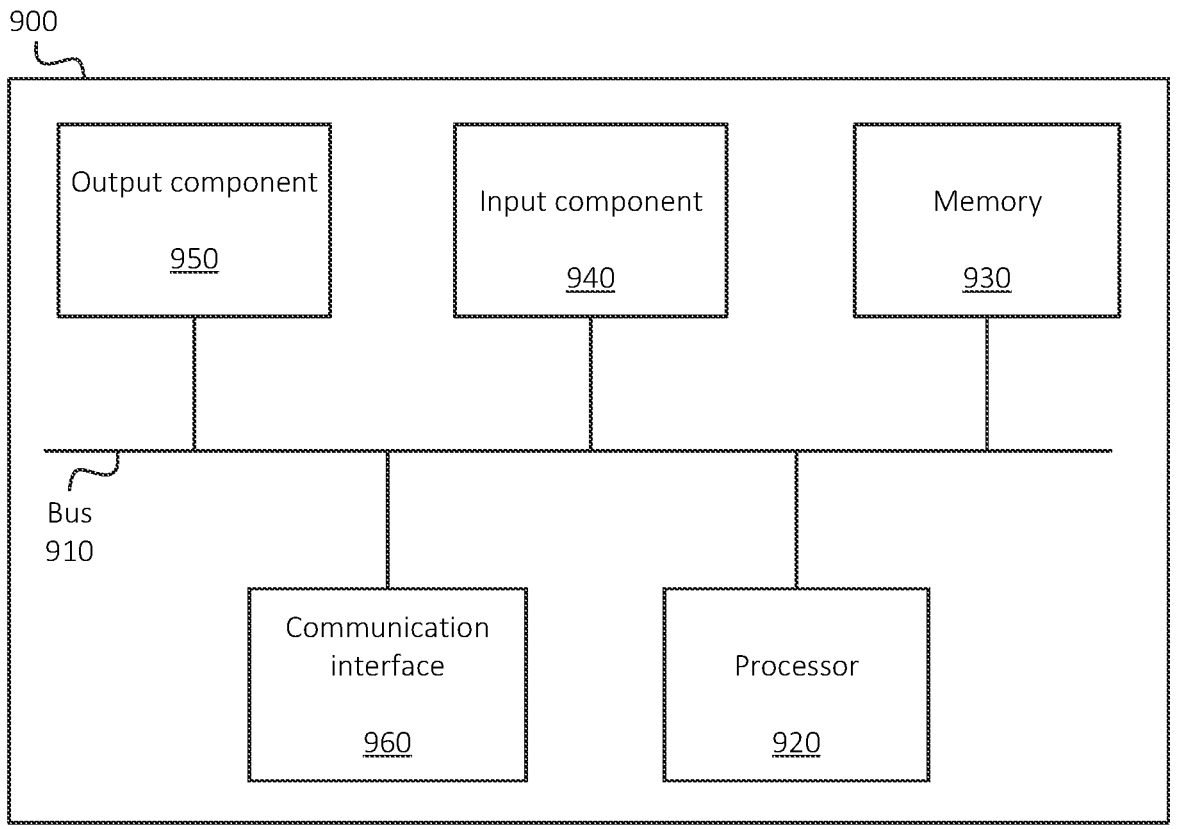
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more processors configured to:
    receive audio associated with a voice call having a particular duration;
    generate a waveform representation of the audio associated with the voice call;
    determine a proportion of the particular duration of the voice call in which an amplitude of the waveform representation of the audio associated with the voice call is above a threshold magnitude;
    determine, based on the proportion of the particular duration of the voice call in which the amplitude of the waveform representation of the audio is above the threshold magnitude, a first expected transcript length and a second expected transcript length, wherein the first expected transcript length is associated with a first language and the second expected transcript length is associated with a second language;
    generate or receive a first transcript, associated with the first language, of the voice call;
    generate or receive a second transcript, associated with the second language, of the voice call;
    identify a first length of the first transcript, associated with the first language, of the voice call;
    compare the first length of the first transcript to the first expected transcript length;
    identify a second length of the second transcript, associated with the second language, of the voice call;
    compare the second length of the second transcript to the first expected transcript length;
    determine, based on comparing the first length of the first transcript to the first expected transcript length and further based on comparing the second length of the second transcript to the second expected transcript length, that the voice call is associated with the first language;
    select a particular set of artificial intelligence/machine learning ("AI/ML") models, out of a plurality of AI/ML models, based on determining that the voice call is associated with the first language;
    determine, based on the selected particular set of AI/ML models, that one or more remedial actions should be performed with respect to a caller associated with the voice call; and
    perform the one or more remedial actions, wherein the one or more remedial actions include blocking subsequent voice calls placed by the caller.

2. The device of claim 1, wherein the first expected length of the first transcript and the first length of the first transcript each include at least a respective one of:
    a quantity of characters,
    a quantity of words, or
    a quantity of phrases.

3. The device of claim 1, wherein determining that the voice call is associated with the first language includes determining that the first length of the first transcript is within a threshold range of the first expected length of the first transcript.

4. The device of claim 1, wherein determining that the voice call is associated with the first language includes:
    comparing audio of the voice call to previously classified audio that has been identified as being associated with the first language,
    wherein determining that the voice call is associated with the first language is based on comparing the audio of the voice call to the previously classified audio associated with the first language.

5. The device of claim 1, wherein performing the one or more remedial actions further includes:
    performing one or more robocall detection techniques associated with a caller from which the voice call was received, based on the first language.

6. A non-transitory computer-readable medium, storing a plurality of processor-executable instructions to:
    receive audio associated with a voice call having a particular duration;
    generate a waveform representation of the audio associated with the voice call;
    determine a proportion of the particular duration of the voice call in which an amplitude of the waveform representation of the audio associated with the voice call is above a threshold magnitude;
    determine, based on the proportion of the particular duration of the voice call in which the amplitude of the waveform representation of the audio is above the threshold magnitude, a first expected transcript length and a second expected transcript length, wherein the first expected transcript length is associated with a first language and the second expected transcript length is associated with a second language;
    generate or receive a first transcript, associated with the first language, of the voice call;
    generate or receive a second transcript, associated with the second language, of the voice call;
    identify a first length of the first transcript, associated with the first language, of the voice call;
    compare the first length of the first transcript to the first expected transcript length;
    identify a second length of the second transcript, associated with the second language, of the voice call;
    compare the second length of the second transcript to the first expected transcript length;
    determine, based on comparing the first length of the first transcript to the first expected transcript length and further based on comparing the second length of the second transcript to the second expected transcript length, that the voice call is associated with the first language;

select a particular set of artificial intelligence/machine learning ("AI/ML") models, out of a plurality of AI/ML models, based on determining that the voice call is associated with the first language;

determine, based on the selected particular set of AI/ML models, that one or more remedial actions should be performed with respect to a caller associated with the voice call; and perform the one or more remedial actions, wherein the one or more remedial actions include blocking subsequent voice calls placed by the caller.

7. The non-transitory computer-readable medium of claim 6, wherein the first expected length of the first transcript and the first length of the first transcript each include at least a respective one of:

a quantity of characters, a quantity of words, or a quantity of phrases.

8. The non-transitory computer-readable medium of claim 6, wherein determining that the voice call is associated with the first language includes determining that the first length of the first transcript is within a threshold range of the first expected length of the first transcript.

9. The non-transitory computer-readable medium of claim 6, wherein determining that the voice call is associated with the first language includes:

comparing audio of the voice call to previously classified audio that has been identified as being associated with the first language, wherein determining that the voice call is associated with the first language is based on comparing the audio of the voice call to the previously classified audio associated with the first language.

10. The non-transitory computer-readable medium of claim 6, wherein performing the one or more remedial actions further includes:

performing one or more robocall detection techniques associated with a caller from which the voice call was received, based on the first language.

11. A method, comprising:

receiving audio associated with a voice call having a particular duration;

generating a waveform representation of the audio associated with the voice call;

determining a proportion of the particular duration of the voice call in which an amplitude of the waveform representation of the audio associated with the voice call is above a threshold magnitude;

determining, based on the proportion of the particular duration of the voice call in which the amplitude of the waveform representation of the audio is above the threshold magnitude, a first expected transcript length and a second expected transcript length, wherein the first expected transcript length is associated with a first language, and the second expected transcript length is associated with a second language;

generating or receiving a first transcript, associated with the first language, of the voice call;

generating or receiving a second transcript, associated with the second language, of the voice call;

identifying a first length of the first transcript, associated with the first language, of the voice call;

comparing the first length of the first transcript to the first expected transcript length;

identifying a second length of the second transcript, associated with the second language, of the voice call;

comparing the second length of the second transcript to the first expected transcript length;

determining, based on comparing the first length of the first transcript to the first expected transcript length and further based on comparing the second length of the second transcript to the second expected transcript length, that the voice call is associated with the first language;

selecting a particular set of artificial intelligence/machine learning ("AI/ML") models, out of a plurality of AI/ML models, based on determining that the voice call is associated with the first language;

determining, based on the selected particular set of AI/ML models, that one or more remedial actions should be performed with respect to a caller associated with the voice call; and performing the one or more remedial actions, wherein the one or more remedial actions include blocking subsequent voice calls placed by the caller.

12. The method of claim 11, wherein the first expected length of the first transcript and the first length of the first transcript each include at least a respective one of:

a quantity of characters, a quantity of words, or a quantity of phrases.

13. The method of claim 11, wherein determining that the voice call is associated with the first language includes determining that the first length of the first transcript is within a threshold range of the first expected length of the first transcript.

14. The method of claim 11, wherein determining that the voice call is associated with the first language includes:

comparing audio of the voice call to previously classified audio that has been identified as being associated with the first language, wherein determining that the voice call is associated with the first language is based on comparing the audio of the voice call to the previously classified audio associated with the first language.

15. The method of claim 11, wherein performing the one or more remedial actions further includes:

performing one or more robocall detection techniques associated with a caller from which the voice call was received, based on the first language.

16. The method of claim 11, wherein determining the proportion of the particular duration of the voice call in which the amplitude of the waveform representation of the audio associated with the voice call is above the threshold magnitude includes determining a proportion of the particular duration of the voice call in which a volume of the audio is above a threshold volume.

17. The method of claim 11, wherein generating the waveform representation of the audio associated with the voice call includes performing a Fast Fourier Transform ("FFT") operation.

18. The device of claim 1, wherein determining the proportion of the particular duration of the voice call in which the amplitude of the waveform representation of the audio associated with the voice call is above the threshold magnitude includes determining a proportion of the particular duration of the voice call in which a volume of the audio is above a threshold volume.

19. The device of claim 1, wherein generating the waveform representation of the audio associated with the voice call includes performing a Fast Fourier Transform ("FFT") operation.

20. The non-transitory computer-readable medium of claim 6, wherein determining the proportion of the particular duration of the voice call in which the amplitude of the waveform representation of the audio associated with the voice call is above the threshold magnitude includes determining a proportion of the particular duration of the voice call in which a volume of the audio is above a threshold volume.

* * * * *